(12) United States Patent
Burke

(10) Patent No.: US 6,683,620 B1
(45) Date of Patent: Jan. 27, 2004

(54) RELATIONAL MODELING OF TRIMMED NURBS SURFACES

(75) Inventor: Thomas Burke, Plymouth, MI (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/296,046

(22) Filed: Apr. 21, 1999

(51) Int. Cl.[7] ............................................. G06T 15/00
(52) U.S. Cl. ...................... 345/620; 345/619; 345/621; 345/622; 345/623; 345/624
(58) Field of Search ................... 345/620, 619, 345/621, 622, 623, 624

(56) References Cited

U.S. PATENT DOCUMENTS

| | | | | |
|---|---|---|---|---|
| 5,243,694 A | * | 9/1993 | Fiasconaro | 395/141 |
| 5,283,860 A | * | 2/1994 | Einkauf et al. | 395/134 |
| 5,303,386 A | * | 4/1994 | Fiasconaro | 395/119 |
| 5,377,320 A | * | 12/1994 | Abi-Ezzi et al. | 395/163 |
| 5,488,684 A | * | 1/1996 | Gharachorloo et al. | 395/123 |
| 5,555,356 A | * | 9/1996 | Scheibl | 395/134 |
| 5,581,672 A | * | 12/1996 | Letcher, Jr. | 395/120 |
| 5,627,949 A | * | 5/1997 | Letcher, Jr. | 395/120 |
| 5,701,404 A | * | 12/1997 | Stevens et al. | 395/123 |
| 6,192,293 B1 | * | 2/2001 | Yamada et al. | 700/182 |

* cited by examiner

Primary Examiner—Michael Razavi
Assistant Examiner—Daniel J Chung
(74) Attorney, Agent, or Firm—Marcel K. Bingham; Hickman Palermo Truong & Becker LLP

(57) ABSTRACT

A method and apparatus are provided relationally modeling a trimmed NURBS surface. The relational model may be formed of a NURBS surface object, a trimming curve object that depends on the NURBS surface object, and a third object which depends on both the NURBS surface object and trimming curve object. Modeling a NURBS surface and a trimmed NURBS surface as separate objects eliminates the issue of circular definitions discussed earlier with respect to relational modeling of trimmed NURBS surfaces.

17 Claims, 6 Drawing Sheets

Surface 210
212
Curve

250 Untrimmed Surface
252
Trimming Curve

260 Trimmed Surface
252

RELATIONAL MODELING OF TRIMMED NURBS SURFACES

FIELD OF THE INVENTION

The present invention relates to computer modeling of geometric shapes and, in particular, to modeling NURBS surfaces.

BACKGROUND OF THE INVENTION

Computer generated 3-D animations enrich a wide range of human experience, captivating audiences at the movie theaters, gluing gamers to their personal computers, and embarking home buyers on virtual tours of new homes. To generate 3-D animations, a 3-D designer creates 3-D computer models of the entities using computer aided design systems (CAD). These models are used to emulate the movement, color, and shape of animated entities, from a dancing baby to space ships trekking through the universe.

3-D models are often composed of graphical components that represent the shapes and surfaces that make up modeled objects. A graphical component is a set of data, procedures, or a combination thereof used to represent a geometry, such as curve or a surface, or a feature of the geometry, such as a curve defining a boundary of a surface.

A CAD system generates a graphical component when, for example, the system receives user input that specifies the definition of a graphical component. The CAD system generates the graphical component as specified by the user input. With earlier CAD systems, designers would determine the position of new components in relation to one or more components already in existence, and input data specifying the position. For example, a CAD system receives user input from a designer that specifies the creation of a line B, and in particular, specifies an endpoint for line B at a particular position. The user has selected the endpoint because it coincides with the endpoint of a line A. In response, the CAD system generates line B with the specified endpoint.

While the position of the endpoint of line B was captured, the intended relationship between line A and line B was not. Thus graphical components generated through earlier CAD systems are essentially independent entities, whose relationship from the perspective of the CAD system were incidental to the manner and order created, and not described to the CAD system. If line A was displaced through a revision, then line B may no longer join line A. To maintain the intended relationship between components, the designer may have to revise each of the related components.

Having to change all components in a relationship when one of those components is revised can be cumbersome, especially for more complex components such as surfaces. For example, a designer may specify a particular surface (blend surface) to provide a blend between two other surfaces (blended surfaces). In the earlier CAD systems, when the designer specified a revision to one of the blended surfaces, the designer would also have to modify the blend surface to maintain the intersection between it and the blended surfaces. In CAD systems, intersections between surfaces account for much of the complexity in the CAD system, and in particular, its user interface.

Capturing the intended relationships between graphical components is especially important to computer generated animation. Without information describing these relationships between graphical components, the computer may not automatically maintain the relationships when revising graphical components.

RELATIONAL MODELING

A solution to the problem of capturing the relationship between graphical components is relational modeling. In relational modeling, graphical components may defined in terms of other graphical components, and the types of operations needed to create the graphical components, including operations that may applied to the other graphical components.

FIG. 1 shows an example of a surface created through relational modeling, and the graphical components used to model the surface. Surface 110 is defined as a loft through a set of lines, and in particular, lines 112, 114, 116, 118, 122, and 124.

Surface component 120 is a graphical component used to model surface 110. Similarly, curve components 152, 154, 156, 158, 162, and 164 are used to model lines 112, 114, 116, 118, 122 and 124. Just as lines 112, 114, 116, 118, 122 and 124 are used to define surface 110, curve component 152, 154, 156, 158, 162, and 164 are used to define surface component 120. Surface component 120 is defined in terms graphical components used to define curves that define surface 110. These graphical components include curve components 152, 154, 156, 158, 162, and 164. Surface component 120 is also associated with operations (e.g. functions, methods) that are applied to curve components 152, 154, 156, 158, and 162 in order to, for example, recalculate data used to define a surface.

The following terms are useful to describing graphical components used in relational modeling. A "surface" component is a graphical component used to model a surface. A particular graphical component is said to "depend" on another graphical component when the particular graphical component is defined in terms of the other graphical component. Thus surface component 120 is said to depend on curve components 152, 154, 156, 158, 162, and 164 because surface component 120 is defined by the curve components.

Graphical components are referred to as being "related" when one of the graphical components depends on the other graphical component. A graphical component that depends on another graphical component is referred to as a "relational" graphical component. Thus, surface component 120 is a relational graphical component. A "relational model" is set of related graphical components used to model a particular geometry. Thus, surface component 120 and curve components 152, 154, 156, 158, 162, and 164 are related, and form a relational model used to depict surface 110.

Because surface component 120 is a relational model, it may be revised through the graphical components on which it depends. Thus surface component 120 may be revised by modification to one of curves 112, 114, 116, 118, 122, and 124. After such a revision, surface 110 may be recalculated and redisplayed to fit the revised curve.

Typically, a graphical component that depends on another contains a reference to the other graphical component. A reference used to refer to another graphical component on which a particular graphical depends is referred to as a relational reference. When a graphical component in an relational model is altered, any graphical component that contains a reference to the altered graphical component may be altered, recalculated, and re-displayed. Thus, when curve component 162 is altered, surface component 120 may be altered and recalculated.

NURBS SURFACES

Surfaces are often modeled through a type of graphical component referred to as a Nonuniform Rational B-spline (NURBS) surface component. NURBS surface components are able to describe smooth shapes, are intuitively editable by a user, and are efficiently calculated by a computer. Surfaces described by NURBS surface components are referred to as NURBS surfaces.

However, one drawback to NURBS surface components is that they require four distinct boundaries. Thus, surface 110 may be described using a NURBS surface component because it has four distinct boundaries, lines 112, 114, 116, and 118.

FIG. 2, on the other hand, shows a surface 210, which may not be described using NURBS surface components. Surface 210 has one boundary, curve 212, not four.

DEFINING SURFACES WITHOUT FOUR SIDES USING NURBS

One approach to overcoming the four-boundary limitation and to building non-four sided surfaces using NURBS surface components involves applying a trimming curve to the NURBS surface, where the trimming curve is defined to be on the NURBS surface. A trimming curve is a closed loop that defines a pattern on a surface. A trimmed surface is a surface that, when rendered, is "trimmed" by a trimming curve. That is, either the portion of the trimmed surface that extends beyond the closed loop of the trimming curve, or the portion of the trimmed surface that resides within the closed loop, is a trimmed NURBS surface that is trimmed by a trimming curve. To model a hole in a surface, the portion on the interior trimming curve may not be rendered as part of the surface. Alternately, portions of the surface on the interior of the trimming curve may be rendered while the portion outside may not. Referring to FIG. 2, to render a surface without four boundaries using a NURBS surface, trimming curve 252 is applied to untrimmed NURBS surface 250, rendering trimmed NURBS surface 260.

Because of the benefits of relational modeling, it would be advantageous to create a relational model that includes both a related NURBS surface component and a trimming curve component. However, to use this approach gives rise to the problem of a circular definition. The problem of circular definition arises because the trimming curve is defined by the surface, and the surface is defined by the trimming curve. A given graphical component cannot be defined by another graphical component whose definition depends on the given graphical component.

Based on the foregoing, it desirable to provide a method of creating a relational model of a trimmed NURBS surface that avoids the problem of circular definition.

SUMMARY OF THE INVENTION

The foregoing needs and objects, and other needs and objects that will become apparent from the following description, are achieved by the present invention, which comprises, in one aspect, a relational model used to model a trimmed NURBS surface. The relational model may be formed of a NURBS surface object, a trimming curve object that depends on the NURBS surface object, and a third object which depends on both the NURBS surface object and trimming curve object. Modeling a NURBS surface and a trimmed NURBS surface as separate objects eliminates the issue of circular definitions discussed earlier with respect to relational modeling of trimmed NURBS surfaces.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for modeling surfaces is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The techniques described herein for creating a trimmed NURBS surface represent graphical components with objects ("graphical objects"). In one embodiment of the present invention, these graphical objects are developed through object oriented technology. An object is a record of data combined with the procedures and functions that manipulate the record. All objects belong to a class. All objects belonging to the same class have the same fields ("attributes") and the same methods. The methods are the procedures and functions used to manipulate the object. An object is said to be an "instance" of the class to which the object belongs. The techniques described herein are not limited to object oriented software. For example, object classes correspond to abstract data types, objects correspond to instances of abstract data types, and the methods of an object correspond to the routines that are used to perform operations on data contained in instances of abstract data types.

Figure 1:
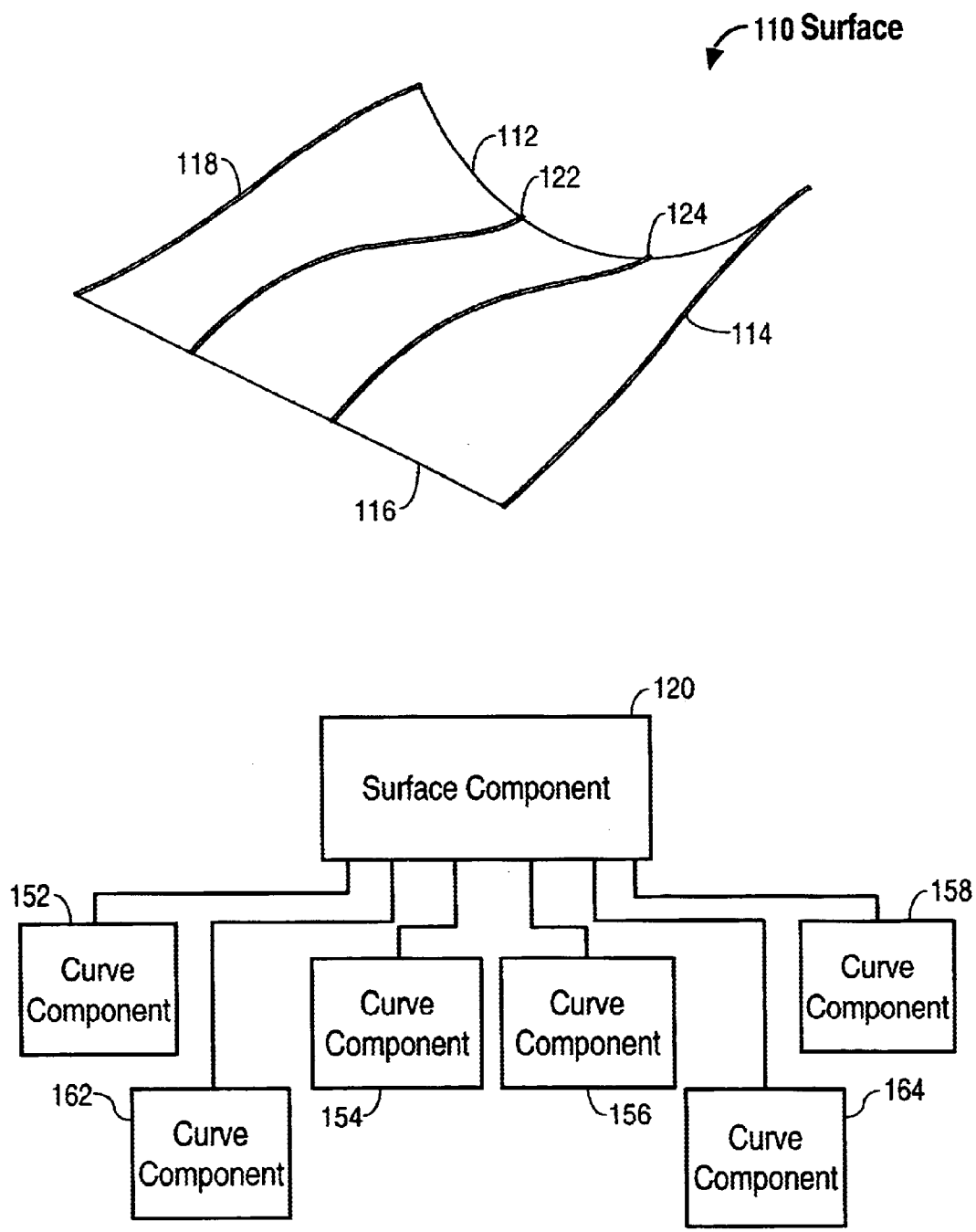
FIG. 1 is a diagram depicting a NURBS surface and a surface component.
Figure 2:
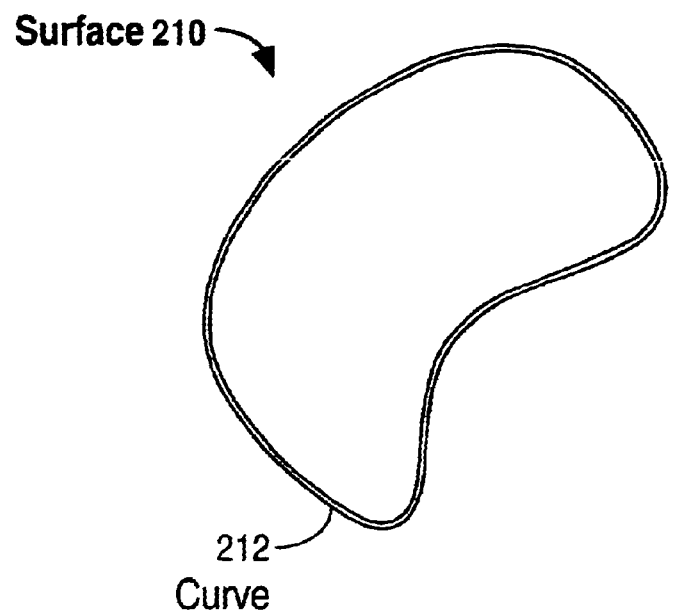
FIG. 2 is a diagram depicting surfaces which may be rendered by applying a trimming curve to a NURBS surface.
Figure 2:
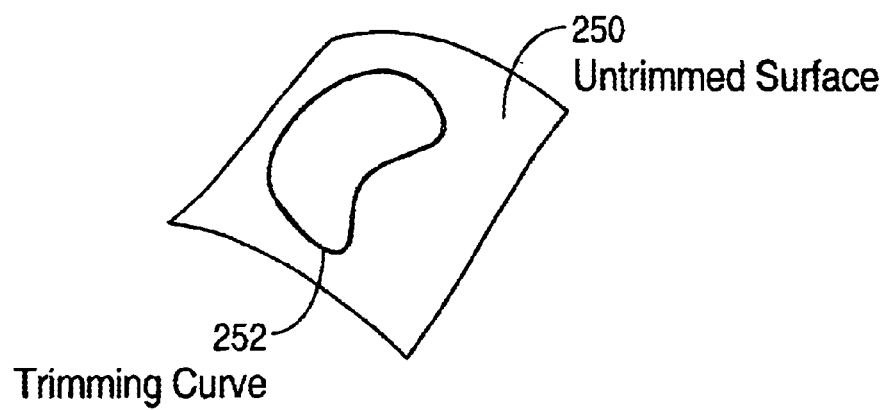
Figure 2:
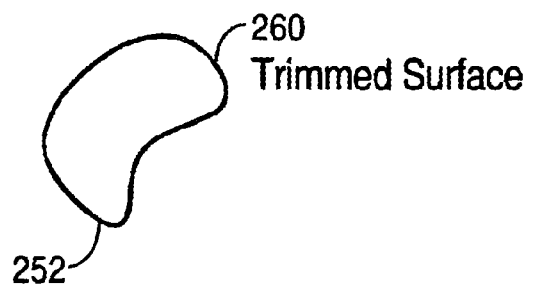
Figure 3:
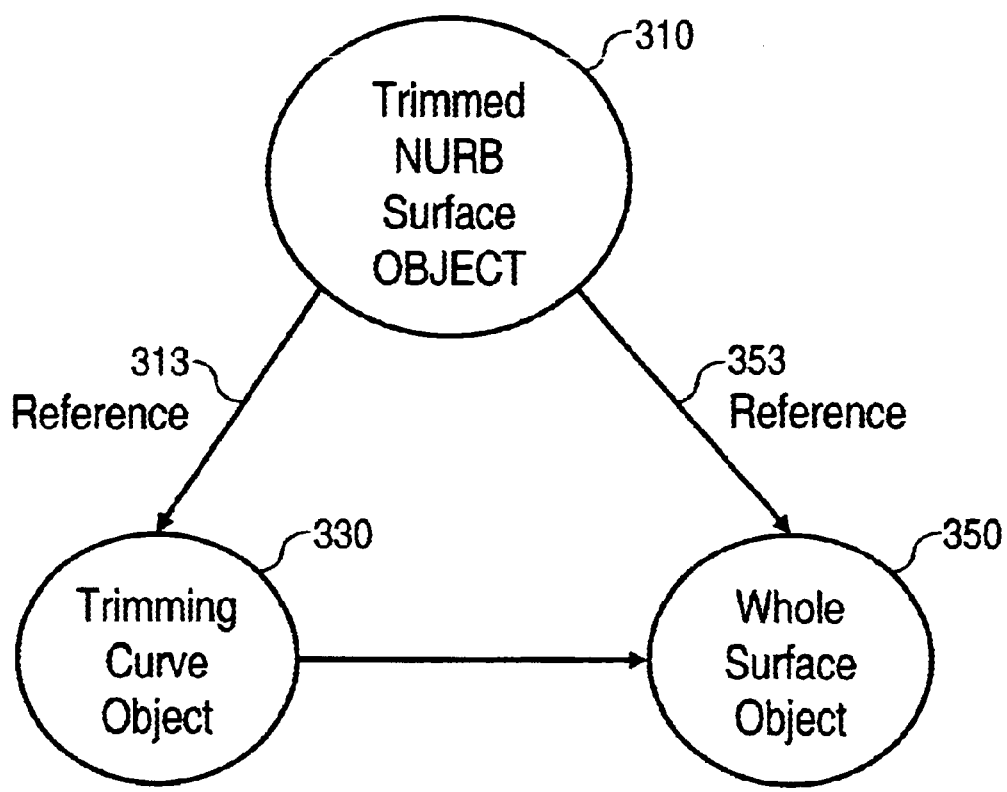
FIG. 3 is a block diagram depicting a trimmed NURBS surface model according to an embodiment of the present invention.

FIG. 3 is block diagram showing a relational model according to an embodiment of the present invention, and in particular, objects that together form a relation model used to model a trimmed NURBS surface. Relational trimmed NURBS surface model 300 includes a trimmed NURBS surface object 310, trimming curve object 330, and whole surface object 350. A trim curve object is a graphical object used to model a trimming curve. A surface object is a graphical object used to model a surface; a trimmed surface object is a surface object used to model a trimmed surface; a whole surface object is a surface object used to model a NURBS surface not trimmed by a trimming curve.

Trimming curve object 330 is defined to be on the surface of whole surface object 350. Thus, trimming curve object 330 is a relational graphical component that depends on whole surface object 350 for its definition.

Trimmed NURBS surface object 310 is a relational graphical component that depends on trimming curve object 330 and whole surface object 350. Trimming curve object 330 contains relational references to objects on which it depends. In particular, relational reference 313 refers to trimming curve object 330, and relational reference 353 refers to whole surface object 350.

Modeling a NURBS surface and a trimmed NURBS surface as separate objects eliminates the issue of circular definitions discussed earlier with respect to relational modeling of trimmed NURBS surfaces. Trimmed NURBS surface object 310 depends on trimming curve object 330 and whole surface object 350, and Trimming curve object 330 depends on whole surface object 350. However, whole surface object 350 depends on neither trimmed NURBS surface object 310 and trimming curve object 330, and thus there is no circular definition.

As mentioned earlier, a relational graphical component refers to the graphical components on which it depends. Thus, it is possible a graphical component may refer to itself indirectly, creating a circular reference. Circular references may be cause cascading calls, as shall be described in greater details. An advantage of the relational trimmed NURBS surface model 300 is that circular references may be eliminated between related graphical components, thus eliminating cascading calls when revisions are reflected throughout a model.

REFLECTING REVISIONS TO GRAPHICAL OBJECTS IN RELATION MODELS

To illustrate the benefit of eliminating circular references in greater detail, it is useful to describe how CAD systems that employ object oriented technology reflect revisions, and how cascading calls occur in the context of object oriented CAD systems. In object oriented CAD systems, when a graphical object is revised, the revision is reflected in the related graphical objects that depend on the given graphical object. In particular, the given object transmits a "revised" message to every dependant object that refers to (i.e. contains a reference to) the given graphical object. The revised message notifies its recipients that the object originating the message has been revised.

In response, the dependant object may record the fact that the revision to the given object has occurred. Typically, for purposes of efficiency, operations necessary to completely reflect the revisions are not executed immediately. Instead, some of these operations may be performed later when the object receives a request to provide rendering data. Such requests are generated periodically when, for example, an animation mechanism refreshes a display. Finally, the dependant object may transmit revision messages to graphical objects that depend on it. Thus, when a graphical object A is revised, it transmits a revision message to dependant object B, which refers to object A. In turn, object B records the fact that the revision occurred, and transmits a revision message to dependant object C, which refers to B.

Assume for purposes of illustration that a relational model X uses graphical objects like those in relational trimmed NURBS surface model 300 to model trimmed NURBS surfaces. Similar to relational trimmed NURBS surface model 300, relational model X includes a trimming curve object X and NURBS surface object X to represent a trimming curve and NURBS surface respectively. Unlike relational trimmed NURBS surface Model 300, relational model X does not include a graphical object corresponding to trimmed NURBS surface object 310. Instead, trimming curve object X and NURBS surface object X are relational objects that depend on each other. Accordingly, trimming curve object X and NURBS surface object X contain references to each other.

Because trimming curve object X and NURBS surface object X refer to each other, a cascading call results when one of them is modified. Specifically, when NURBS surface object X is modified, it transmits a message to trimming curve object X, the graphical object that refers to it. In turn, trimming curve object X transmits a message to NURBS surface object X, the graphical object that refers to it. In response, NURBS surface object X transmits a message to trimming curve object X, and so forth.

On the other hand, relational trimmed NURBS surface model 300 is not afflicted with circular referencing in this way, and thus prevents cascading calls. For example, when whole surface object 350 is revised, a revised message is transmitted to trimmed NURBS surface object 310. Trimmed NURBS surface object 310 transmits a revised message to trimming curve object 330. Trimming Curve Object 330 does not transmit a revised message because no object referred to it.

NURBS SURFACES TRIMMED BY MULTIPLE TRIMMING CURVES

To render more intricate surfaces, surfaces may be trimmed by multiple trimming curves. Such surfaces are referred to herein as multi-trimmed surfaces. Multi-trimmed surfaces may be conveniently modeled by a hierarchy of related trimmed surface objects.

Figure 4:
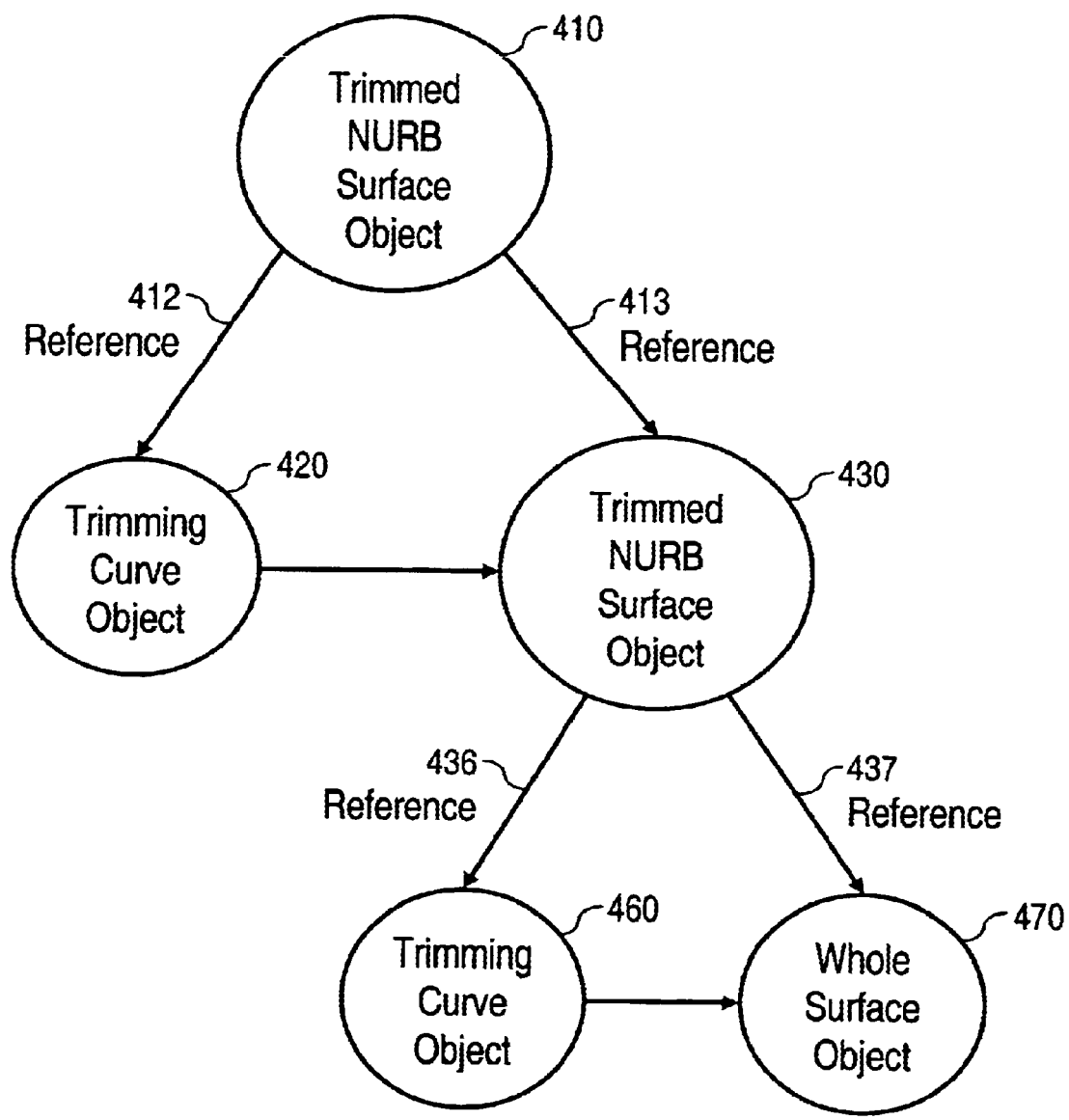
FIG. 4 is a block diagram depicting a trimmed NURBS surface model based on a hierarchy of trimmed NURBS surface objects.

FIG. 4 shows a relational model for representing multi-trimmed surfaces according to an embodiment of the present invention. Multi-trimmed NURBS surface model 400 includes trimmed NURBS surface objects 410 and 430, trimming curve objects 420 and 460, and whole surface object 470. Trimmed NURBS surface object 410 depends on trimming curve object 420 and trimmed NURBS surface object 430, and contains references 412 and 413, which respectively refer to trimming curve object 420 and trimmed NURBS surface object 430. Trimming curve object 420 is relational graphical component used to model a trimming curve. Trimming curve object 420 depends on trimmed NURBS surface object 310.

Trimmed NURBS Surface object 430 depends on trimming curve object 460 and whole surface object 470, and contains references 436 and 437, which refer to trimming curve object 460 and whole surface object 470 respectively. Trimming curve object 460 depends on whole surface object 350.

Figure 5:
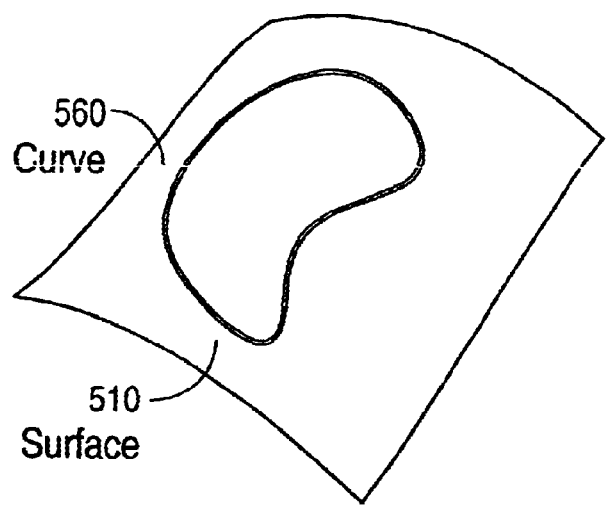
FIG. 5 depicts various surfaces that portray how a hierarchy of trimmed NURBS surfaces objects may be used to model a multi-trimmed NURBS surface.
Figure 5:
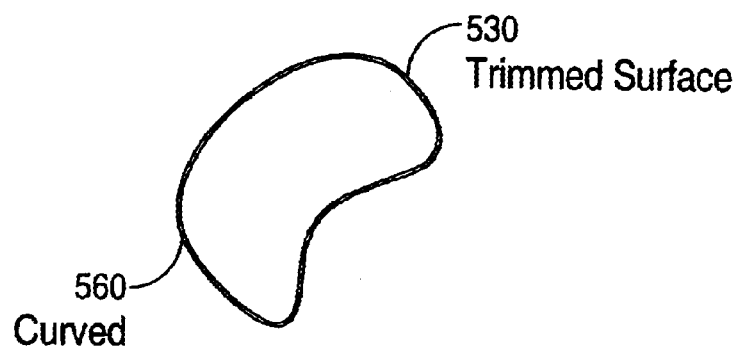
Figure 5:
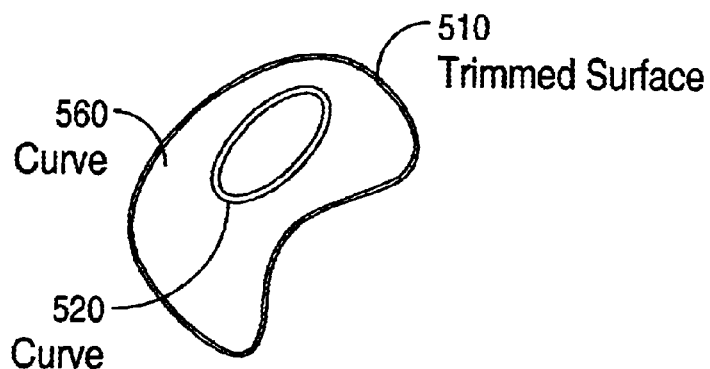

FIG. 5 shows the Trimmed NURBS surfaces represented by Multi-Trimmed NURBS Surface model 400, and visually portrays how each trimmed surface object in a hierarchy of trimmed surface objects contributes to the multi-trimmed NURBS surface represented by Multi-Trimmed NURBS surface model 400.

Referring to FIG. 5, curve 560 is represented by trimming curve object 460, surface 570 is represented by whole surface object 470. Trimmed surface 530 depicts surface 570 trimmed by curve 560, and is represented by trimmed NURBS Surface object 430. Multi-Trimmed surface 510 depicts trimmed surface 530 trimmed by curve 520, and is represented by Multi-trimmed surface 510.

The Relational Trimmed surface models described herein provide various advantages. As mentioned previously, the problem of circular definition and circular references are avoided. Relational models enable the animation of graphical components, unleashing the inherit power and advantages of NURBS surfaces to the field computer animation.

HARDWARE OVERVIEW

Figure 6:
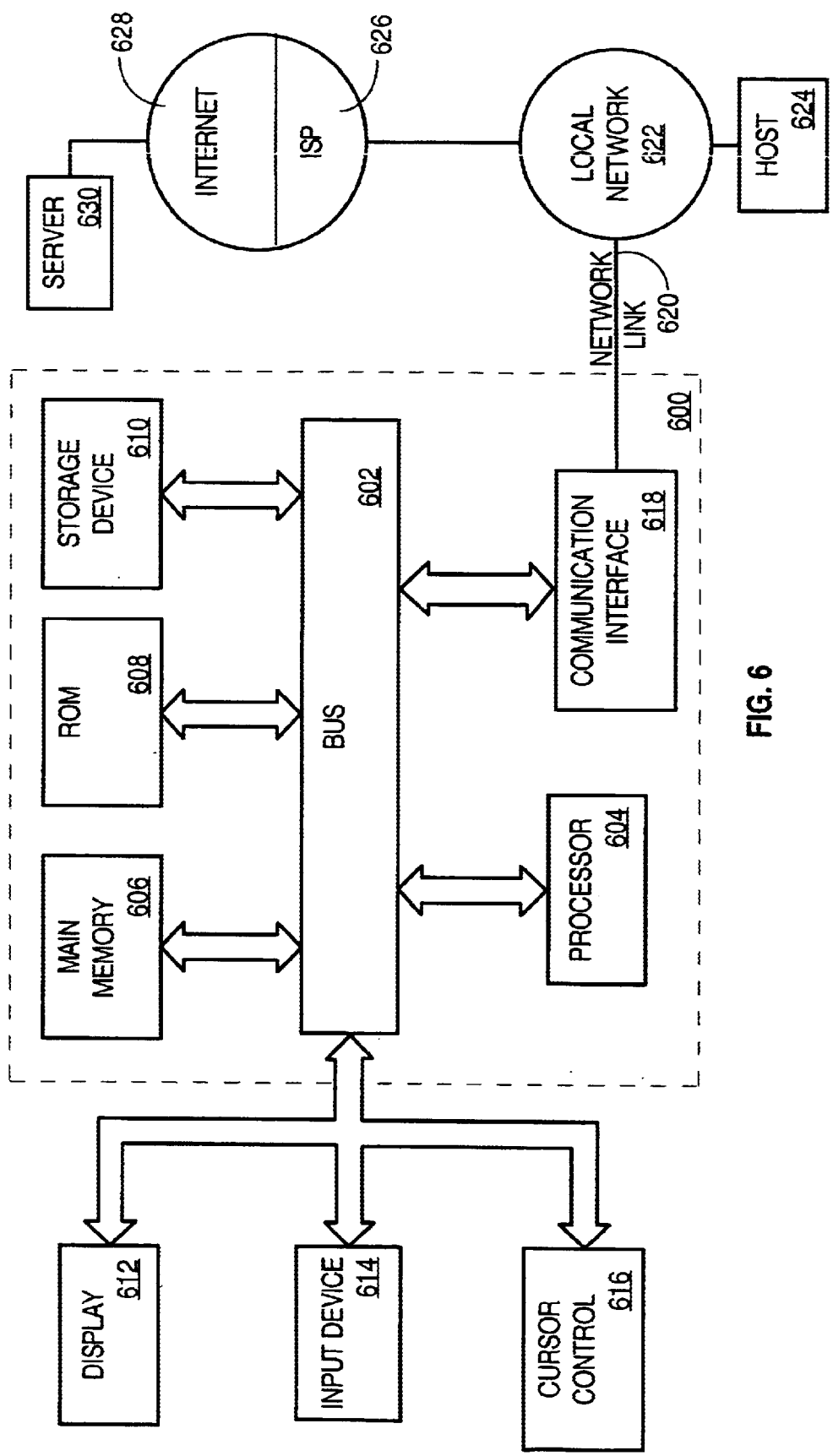
FIG. 6 depicts a computer system upon which an embodiment of the present invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for modeling surfaces. According to one embodiment of the invention, modeling surfaces is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for modeling surfaces as described herein.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of generating graphical objects that are used to model a surface, the method comprising the steps:

generating a surface object that defines a particular surface;

generating a trimming curve object that defines a trimming curve on said surface, wherein said trimming curve object is a relational graphical object that depends on said surface object;

generating a trimmed surface object that defines a trimmed surface, wherein the trimmed surface is said surface trimmed by said trimming curve, wherein said trimmed surface object is a relational graphical object that depends on said trimming curves object and on said surface object;

wherein said surface object is a first record of data defined by a first definition;

wherein said trimming curve object is a second record of data defined by a second definition, said second definition referring to the first definition of the surface object;

wherein said trimmed surface object is a third record of data defined by a third definition, said third definition referring to the first definition of the surface object and the second definition of said trimming curve object; and wherein the step of generating a surface object includes generating a NURBS surface object.

2. The method of claim 1, wherein:

said surface object is another trimmed surface object;

wherein the step of generating said surface object is performed by:

generating another surface object that defines another surface;

generating another trimmed curve object that defines another trimmed curve on said other surface, wherein said other trimmed curve object is a relational object that depends on said other surface object; and generating said other trimmed surface object that defines another trimmed surface, wherein said other trimmed surface is said other surface trimmed by said other trimming curve, wherein said other trimmed surface object is a relational graphical object that depends on said other trimming curve object and said other surface object.

3. The method of claim 1, further including the steps:

detecting a revision to at least one of said surface object and said trimming curve object;

in response to said revision, detecting that said trimmed surface object is a relational object that depends on said at least one of said surface object and said trimming curve object; and reflecting said revision in said trimmed surface.

4. The method of claim 3, wherein the step of reflecting includes transmitting a revision message to said trimmed surface.

5. The method of claim 3, further including the step of generating said revision as part of an animation operation.

6. The method claim 1, the method further including the steps of:

detecting a first revision to the surface object;

performing a second revision to the trimming curve in response to said first revision, and performing a third revision to said trimmed surface object in response to said first and second revisions.

7. A computer-readable medium carrying one or more sequences of one or more instructions for generating graphical objects that are used to model a surface, the one or more sequences of one or more instructions including instructions which, when executed by one or more processors, cause the one or more processors to perform the steps of:

generating a surface object that defines a particular surface;

generating a trimming curve object that defines a trimming curve on said surface, wherein said trimming curve object is a relational graphical object that depends on said surface object;

generating a trimmed surface object that defines a trimmed surface, wherein the trimmed surface is said surface trimmed by said trimming curve, wherein said trimmed surface object is a relational graphical object that depends on said trimming curve object and on said surface object;

wherein said surface object is a first record of data defined by a first definition;

wherein said trimming curve object is a second record of data defined by a second definition, said second definition referring to the first definition of the surface object;

wherein said trimmed surface object is a third record of data defined by a third definition, said third definition referring to the first definition of the surface object and the second definition of said trimming curve object; and wherein the step of generating a surface object includes generating a NURBS surface object.

8. The computer-readable medium of claim 7, wherein:

said surface object is another trimmed surface object;

wherein the step of generating said surface object is performed by:

generating another surface object that defines another surface;

generating another trimmed curve object that defines another trimmed curve on said other surface, wherein said other trimmed curve object is a relational object that depends on said other surface object; and generating said other trimmed surface object that defines another trimmed surface, wherein said other trimmed surface is said other surface trimmed by said other trimming curve, wherein said other trimmed surface object is a relational graphical object that depends on said other trimming curve object and said other surface object.

9. The computer-readable medium of claim 7, further including sequences of instructions for performing the steps:

detecting a revision to at least one of said surface object and said trimming curve object;

in response to said revision, detecting that said trimmed surface object is a relational object that depends on said at least one of said surface object and said trimming curve object; and reflecting said revision in said trimmed surface.

10. The computer-readable medium of claim 9, wherein the step of reflecting includes transmitting a revision message to said trimmed surface.

11. The computer-readable medium of claim 9, further including the step of generating said revision as part of an animation operation.

12. The computer-readable medium claim 7, the method further including sequences of instructions for performing the steps of:

detecting a first revision to the surface object;

performing a second revision to the trimming curve in response to said first revision; and performing a third revision to said trimmed surface object in response to said first and second revisions.

13. A computer system, comprising:

one or more processors;

one or more memories coupled to said one or more processors;

said one or more processors configured to generate in said one or more memories a surface object that defines a particular surface;

said one or more processors configured to generate in said one or more memories a trimming curve object that defines a trimming curve on said surface, wherein said trimming curve object is a relational object that depends on said surface object; and said one or more processors configured to generate in said one of more memories a trimmed surface object that defines a trimmed surface, wherein the trimmed surface is said surface trimmed by said trimming curve, wherein said trimmed surface object is a relational graphical object that depends on said trimming curve object and on said surface object;

wherein said surface object is a first record of data defined by a first definition;

wherein said trimming curve object is a second record of data defined by a second definition, said second definition referring to the first definition of the surface object;

wherein said trimmed surface object is a third record of data defined by a third definition, said third definition referring to the first definition of the surface object and the second definition of said trimming curve object; and wherein said one or more processors is configured to generate said surface object as a NURBS surface object.

14. The computer system of claim 13, wherein:

said surface object is another trimmed surface object;

said one or more processors is configured to generate said surface object by performing the steps of:

generating another surface object that defines another surface;

generating another trimmed curve object that defines another trimmed curve on said other surface, wherein said other trimmed curve object is a relational object that depends on said other surface object; and generating said other trimmed surface object that defines another trimmed surface, wherein said other trimmed surface is said other surface trimmed by said other trimming curve, wherein said other trimmed surface object is a relational graphical object that depends on said other trimming curve object and said other surface object.

15. The computer system of claim 13, wherein:

said one or more processors is configured to detect a revision to at least one of said surface object and said trimming curve object;

said one or more processors configured to, in response to said revision, detect that said trimmed surface object is a relational object that depends on said at least one of said surface object and said trimming curve object; and said one or more processors configured to reflect said revision in said trimmed surface.

16. The computer system of claim 15, wherein said one or more processors is configured to reflect said revision by transmitting a revision message to said trimmed surface.

17. The computer system of claim 15, wherein said one or more processors is configured to generate said revision as part of an animation operation.

* * * * *